US012168305B2

(12) United States Patent
Clössner

(10) Patent No.: US 12,168,305 B2
(45) Date of Patent: Dec. 17, 2024

(54) PACKAGING MACHINE WITH A DEVICE FOR CUTTING FOOD PACKAGING ALONG A LONGITUDINAL DIRECTION

(71) Applicant: WEBER FOOD TECHNOLOGY GMBH, Breidenbach (DE)

(72) Inventor: Stephan Clössner, Katzenfurt (DE)

(73) Assignee: WEBER FOOD TECHNOLOGY GMBH, Breidenbach (DE)

( * ) Notice: Subject to any disclaimer, the term of this patent is extended or adjusted under 35 U.S.C. 154(b) by 0 days.

(21) Appl. No.: 17/734,248

(22) Filed: May 2, 2022

(65) Prior Publication Data

US 2022/0355505 A1 Nov. 10, 2022

(30) Foreign Application Priority Data

May 4, 2021 (DE) .......................... 102021111559.0
Aug. 4, 2021 (DE) .......................... 102021120316.3

(51) Int. Cl.

*B26D 7/26* (2006.01)
*B26D 1/24* (2006.01)
*B65B 61/08* (2006.01)

(52) U.S. Cl.

CPC ........... *B26D 7/2635* (2013.01); *B26D 1/245* (2013.01); *B26D 7/2621* (2013.01); *B65B 61/08* (2013.01)

(58) Field of Classification Search

CPC ......... B26D 7/2635; B26D 1/245; B26D 1/24
See application file for complete search history.

(56) References Cited

U.S. PATENT DOCUMENTS 3,595,114 A * 7/1971 Osborn ................ B26D 7/2635 83/485
4,899,630 A * 2/1990 Shioya .................. B26D 1/245 83/504

(Continued)

FOREIGN PATENT DOCUMENTS

CN 108568853 A 9/2018
DE 3428948 A1 3/1985

(Continued)

OTHER PUBLICATIONS

European Search Report mailed Oct. 7, 2022 corresponding to European Patent Application No. 22 17 1139, 10 pages.

(Continued)

*Primary Examiner* — Sean M Michalski
(74) *Attorney, Agent, or Firm* — Dickinson Wright PLLC

(57) ABSTRACT

The invention relates to a packaging machine comprising an apparatus for cutting food packagings to size along a longitudinal direction, wherein the apparatus defines an inner space and an outer region, said apparatus having a first shaft, which extends in the inner space and on which at least a first cutting blade is arranged, and a second shaft which extends in the inner space and on which at least a second cutting blade is arranged, said second cutting blade forming a cutting unit arranged in the inner space together with the first cutting blade during operation, wherein the first cutting blade is axially displaceably supported on the respective shaft to change an axial spacing and an axial contact pressure between the first cutting blade and the second cutting blade of the cutting unit, and said apparatus having an adjustment mechanism, wherein the adjustment mechanism is coupled to the axially displaceable first cutting blade to displace the displaceable cutting blade in an axial direction. The invention furthermore relates to a method of (Continued)

Figure 1:
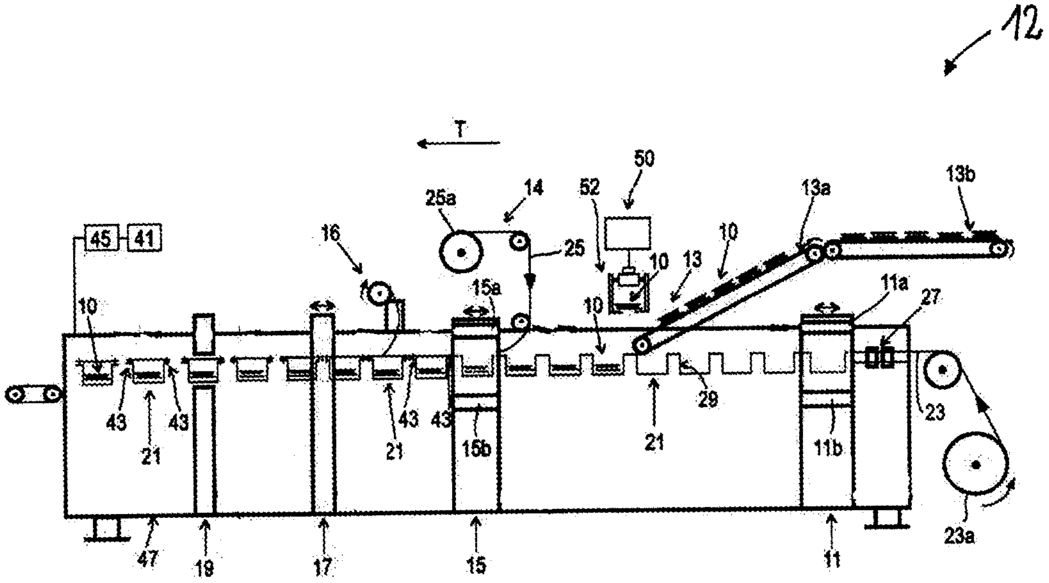

setting a contact force between a first cutting blade and a second cutting blade of a cutting unit of a packaging machine.

31 Claims, 9 Drawing Sheets

(56) References Cited

U.S. PATENT DOCUMENTS

| | | | | |
|---|---|---|---|---|
| 5,596,918 | A * | 1/1997 | Longwell | B26D 7/2621 83/425.2 |
| 8,191,451 | B2 * | 6/2012 | Stolyar | B26D 7/2635 83/72 |
| 10,272,583 | B2 * | 4/2019 | Oiwa | B26D 7/2621 |
| 2004/0149105 | A1 * | 8/2004 | Michalski | B26D 7/20 83/507 |
| 2006/0185487 | A1 * | 8/2006 | Li | B26D 1/245 83/498 |
| 2008/0295664 | A1 * | 12/2008 | Stolyar | B26D 7/2635 83/506 |
| 2010/0170373 | A1 * | 7/2010 | Green | B65H 35/02 83/639.1 |
| 2010/0218653 | A1 * | 9/2010 | Okihara | B26D 5/34 83/13 |
| 2012/0031251 | A1 * | 2/2012 | Momonaka | B26D 1/245 83/864 |
| 2021/0331341 | A1 * | 10/2021 | Ormaechea Saracibar | B41J 11/70 |
| 2022/0355505 | A1 * | 11/2022 | Clössner | B65B 61/08 |

FOREIGN PATENT DOCUMENTS

| | | | |
|---|---|---|---|
| DE | 3914184 | A1 | 12/1989 |
| DE | 4236347 | A1 | 5/1994 |
| DE | 19907591 | A1 | 8/2000 |
| DE | 102015225942 | A1 | 6/2016 |
| DE | 102018128110 | A1 | 5/2020 |
| DE | 102019204477 | A1 | 10/2020 |
| GB | 2144670 | A | 3/1985 |

OTHER PUBLICATIONS

German Search Report mailed Feb. 16, 2022 for German Application No. 10 2021 120 316.3, 6 pages.

* cited by examiner

PACKAGING MACHINE WITH A DEVICE FOR CUTTING FOOD PACKAGING ALONG A LONGITUDINAL DIRECTION

CROSS-REFERENCES TO RELATED APPLICATIONS

This application claims the priority of German Patent Application 10 2021 111 559.0, filed on May 4, 2021, and German Patent Application 10 2021 120 316.3, filed Aug. 4, 2021, each of which is incorporated herein by reference, in their entirety.

The invention generally relates to a packaging machine comprising an apparatus for cutting food packagings to size along a longitudinal direction.

Such packaging machines comprising an apparatus for cutting food packagings to size along a longitudinal direction are used in food processing lines to cut packagings to size in the longitudinal direction, i.e. in the product conveying direction, that are loaded with foods and subsequently sealed, but are still contiguous. In other words, the food slices, e.g. sausage slices or cheese slices, cut off by a slicer, in particular a high-performance slicer, are packaged portion-wise into contiguous packagings by the packaging machine and are subsequently cut apart into individual packagings by means of the apparatus for cutting food packagings to size along its longitudinal direction. These portions can also consist of only one slice or one piece.

So-called cutting units, which are formed from upper blades and lower blades, serve for the cutting to size of the food packagings. To achieve a good cutting quality, it is important that a spacing between the cutting blades or a contact force between the cutting blades of the cutting unit is set correctly. The contact force between the cutting blades has so far been set in that the cutting blades are manually displaced along their blade shafts until a desired contact force is set between the upper blade and the corresponding lower blade. This kind of setting of the contact pressure has several disadvantages. On the one hand, there is a risk that a careless user could injure himself through a contact with the cutting blade. Furthermore, the setting of the cutting blades with respect to one another requires time, expertise, and experience.

The German patent application DE 10 2018 128 110 A1 describes an improvement of the settability of the cutting blades with respect to one another. Here, a floating support of the cutting blades serves the purpose of the longitudinal cutting device being able to be configured in a simpler and more time-efficient manner. However, there is also a residual risk with this longitudinal cutting device that a careless user could injure himself through a contact with the cutting blade.

It is an object of the present invention to eliminate the disadvantages of the prior art and thus to provide a packaging machine comprising an apparatus for cutting food packagings to size along a longitudinal direction by means of which a safer setting of the apparatus is possible.

The object is satisfied by a packaging machine comprising an apparatus for cutting food packagings to size along a longitudinal direction in accordance with claim 1 and in particular in that an adjustment mechanism is provided, wherein the adjustment mechanism is coupled to an axially displaceable first cutting blade to displace the displaceable cutting blade in an axial direction.

In other words, the displaceable cutting blade or its blade mount does not have to be directly manually displaced on the respective blade shaft, but an adjustment mechanism is provided that allows an adjustment of the cutting blade without contacting the cutting blade or its blade mount. The adjustment mechanism consequently serves to adjust the cutting blade and possibly its blade mount by means of a component of the adjustment mechanism coupled to the cutting blade or its blade mount. The risk of a contact between the cutting blade and the user, i.e. the person setting the apparatus, can hereby be considerably minimized and the risk of injury on the setting of the cutting unit can thus be minimized.

Advantageous embodiments of the invention can be seen from the dependent claims, the description, and the drawings.

The packaging machine is preferably part of a food processing line. The food processing line can comprise a slicer, in particular a high-performance slicer, a portioning belt, a sorting and conveying line, an insertion station comprising a feeder or a picking robot, a sealing station, a labeling station, and/or a transverse separation station, i.e. an apparatus for a transverse cutting of the food packagings.

The apparatus defines an inner space that substantially corresponds to or includes the working region of the cutting apparatus. An engagement into this inner space usually generates a risk since the cutting blades of the apparatus are located in this inner space. Furthermore, the apparatus defines an outer region. In the outer region, there is no risk of coming into contact with one of the cutting blades. A boundary between the inner space and the outer region of the apparatus can be sectionally defined by an intervention protection. The intervention protection is preferably movably arranged so that it can be adjusted between a shielding position shielding the inner space and a release position releasing the inner space.

A first shaft, on which at least a first cutting blade is arranged, extends in the inner space. The first cutting blade is preferably rotationally fixedly arranged on the shaft. In this case, the first shaft can represent a drive shaft for the first cutting blade. For this purpose, the drive shaft can be rotationally drivable.

A second shaft, on which at least a second cutting blade is arranged, also extends in the inner space. The second cutting blade is preferably rotationally fixedly arranged on the second shaft. In this case, the second shaft can represent a drive shaft for the second cutting blade. To transmit a torque to the second cutting blade, the drive shaft can be rotationally drivable.

The first cutting blade and the second cutting blade together form a cutting unit arranged in the inner space. In other words, the two cutting blades form a unit by which the food packagings can be cut to size in the longitudinal direction. The two cutting blades preferably form a roller shear cutting unit, i.e. two cutting blades rotating in opposite directions and overlapping in the radial direction, in particular circular blades. All the features that are disclosed with respect to the general term "cutting unit" also apply to the more specific roller shear cutting unit.

To be able to set the cutting unit, the first cutting blade is axially displaceably supported on the respective shaft. The axial spacing and thus the axial contact pressure between the cutting blades of the cutting unit can hereby be changed. The displaceability of the first cutting blade can in particular serve to adjust the first cutting blade between an inactive position, in which the first cutting blade and the second cutting blade are spaced apart from one another, and an active position in which the first cutting blade and the second cutting blade are pressed toward one another. The cutting blade is preferably fixed on a blade holder and the blade holder is displaceably supported on the shaft.

In accordance with an embodiment, the adjustment mechanism projects from the outer region into the inner space of the apparatus. If the adjustment mechanism can be operated by hand, i.e. manually, it is advantageous if an adjustment element to be adjusted by the user, i.e. which serves to be gripped and adjusted by the user, is at least sectionally located in the outer region of the apparatus. Alternatively thereto, the adjustment element can indeed be arranged in the inner space, but remote from the cutting blades.

Alternatively to a manual adjustability of the adjustment mechanism, the adjustment mechanism can be coupled to a mechanical drive, in particular a motor drive. A mechanical drive is understood as a drive in which the driving force is applied by a machine, i.e. not by muscle power. Such a drive can be arranged in the inner space of the apparatus or in the outer region of the apparatus.

A manual adjustment element in the outer region of the apparatus and a mechanical drive both have the advantage that an axial contact pressure between the cutting blades can be set by the user without having to reach into the proximity of the cutting blade.

In accordance with an embodiment, at least two axially displaceable first cutting blades are arranged on the first shaft. The adjustment mechanism is preferably coupled to the axially displaceable first cutting blades such that the first cutting blades can be displaced at the same time in the axial direction. The setting time can hereby be minimized. The adjustment mechanism is advantageously coupled to the axially displaceable first cutting blades such that the axially displaceable first cutting blades can be displaced at the same speed in the axial direction.

In accordance with an embodiment, the two axially displaceable first cutting blades form a cutting unit arranged in the inner space together with the second cutting blade during operation. In this case, the adjustment mechanism can be coupled to the axially displaceable first cutting blades such that the first cutting blades can be displaced at the same time, in particular at the same speed and/or by the same path distance, in opposite axial directions. The spacings or contact forces between the first cutting blades and the second cutting blade, which is configured as a counter-blade, can hereby be set at the same time and the setup time can be further reduced.

Between the two first cutting blades, a disk can be arranged whose diameter is smaller than that of the cutting blades and whose thickness is adapted to a thickness of the second cutting blade, i.e. of the counter-blade. Packaging strips can hereby be clamped and transported away in a guided manner between the disk and the second cutting blade.

In accordance with an embodiment, the at least one axially displaceable first cutting blade is coupled to a cutting blade holder that is axially displaceably, but rotationally fixedly coupled to the first shaft. First coupling means are preferably provided at the cutting blade holder and cooperate with second coupling means of the adjustment mechanism to axially displace the axially movable cutting blade holder together with the at least one first cutting blade. The coupling means can be configured as mechanical coupling means. The force for adjusting the cutting blades can be transmittable from the adjustment mechanism to the cutting blade holder by means of a form fit.

In accordance with an embodiment, the first coupling means are formed as a peripheral groove at the cutting blade holder and the second coupling means of the adjustment mechanism are formed as an axially adjustable adjustment element engaging into the groove. Alternatively thereto, the first coupling means can be formed as a peripheral rib at the cutting blade holder and the second coupling means of the adjustment mechanism can be formed as an axially adjustable adjustment element engaging around the rib at both sides.

In accordance with an embodiment, the adjustment mechanism comprises a drive shaft extending in the direction of the first shaft and/or the second shaft. The adjustment mechanism can comprise a gear to convert a rotational drive movement of the drive shaft into a translatory movement of the at least one first cutting blade along the first shaft. The adjustment mechanism preferably comprises a plurality of gears to convert a rotational drive movement of the drive shaft into respective translatory movements of the first cutting blades along the first shaft.

In accordance with an embodiment, the drive shaft at least sectionally has a non-circular cross-section, for example a hexagonal cross-section. An axially secured sleeve comprising an inner peripheral surface adapted to the non-circular cross-section and an outer thread on an outer peripheral surface can be arranged on the sectionally non-circular cross-section. The adjustment element or a part coupled to the adjustment element can in turn have an opening that extends in the axial direction and that has an internal thread engaging into the external thread. The gear defined by the above-mentioned features is simple to manufacture and produces a precise conversion of a rotational movement of the drive shaft of the adjustment mechanism into a translatory movement of the adjustment element and of the cutting blade.

In accordance with an embodiment, the adjustment element is supported guided in the axial direction of the first shaft, in particular along a separate guide rod. A precise guidance of the adjustment element that is easy to be established is hereby made possible.

To monitor a position of the first cutting blades, a sensor can be provided to determine a position, in particular an angular position, of the adjustment mechanism. The sensor can in particular be configured to determine an angular position of the drive shaft of the adjustment mechanism. The apparatus can comprise a control device that evaluates, on the basis of the position determined by the sensor, during operation whether the at least one first cutting blade and the at least one second cutting blade contact one another with a necessary contact pressure to cut the food packagings to size.

In general, a determination device for determining a contact pressure between the at least one first cutting blade and its respective counter-blade can be provided. An apparatus for cutting food packagings to size usually has a blade drive that drives the at least one first cutting blade and, under certain circumstances, also the at least one second cutting blade or counter-blade, i.e. sets them into rotation. Via a measurement of the required drive torque of the blade drive in the idling state, i.e. when no food packagings are cut to size, a determination can be made whether the at least one cutting blade contacts its counter-blade with the necessary contact pressure. The required drive torque can be compared with reference values that were either predefined or determined during a reference operation. Thus, it is advantageous if a measurement device is provided that is configured to measure the drive torque of the blade drive. Furthermore, the measured drive torque can be used to adapt a contact pressure between the at least one cutting blade and its counter-blade if the contact pressure does not correspond to a desired contact pressure. For this purpose, the measurement device can be connected to an actuating drive for adjusting the adjustment mechanism. The blade drive preferably comprises at least one electric motor. In this case, the motor current can, for example, be measured and a contact pressure can be calculated therefrom.

If the at least one cutting blade is adjusted by a motor, a contact pressure between the at least one first cutting blade and its respective counter-blade can alternatively or additionally be measured via the required power of the actuating drive. If the actuating drive is configured as an electric motor, a determination can be made in a simple manner via a measurement of the motor current whether the at least one cutting blade is possibly pressed too strongly or too weakly against the respective counter-blade. Alternatively thereto, a contact pressure between the at least one first cutting blade and its respective counter-blade can be measured via a force measurement device, for example, via a strain gauge or another force sensor. Alternatively or additionally, a determination could also be made indirectly, for example via the measurement of an adjustment path of the at least one cutting blade relative to its counter-blade, whether the at least one cutting blade is possibly pressed too strongly or too weakly against the respective counter-blade.

In accordance with an embodiment, a regulation device is provided to regulate a contact pressure between the first cutting blade and its respective counter-blade to a desired value. The adjustment mechanism is then adjusted in dependence on the measured contact pressure such that the contact pressure between the at least one cutting blade and its respective counter-blade is as close as possible to a desired value stored in a control software of the packaging machine.

In accordance with an embodiment, a support of the at least one first cutting blade and/or the at least one second cutting blade, which can also be designated as a counter-blade when the first cutting blade and the second cutting blade form a cutting unit, is settable. For example, a support of the cutting blade can be settable such that a defined axis of rotation of the cutting blade can be changed with respect to its orientation. The so-called shear angle between the first cutting blade and its counter-blade is hereby settable. In other words, an angle between an axis of rotation of the first cutting blade and an axis of rotation of the second cutting blade is settable viewed in the conveying direction. Alternatively or additionally, the axis of rotation of the first cutting blade and/or of the counter-blade can be adjustable with respect to its position, for example vertically adjustable.

The object is also satisfied by a method of setting a contact force between a first cutting blade and a second cutting blade of a cutting unit of a packaging machine comprising the steps:

providing an apparatus for cutting food packagings to size along a longitudinal direction, wherein the apparatus defines an inner space and an outer region, and wherein the apparatus comprises: a first shaft, which extends in the inner space and on which at least a first cutting blade is arranged, and a second shaft which extends in the inner space and on which at least a second cutting blade is arranged, said second cutting blade forming a cutting unit arranged in the inner space, in particular a roller shear cutting unit, together with the first cutting blade during operation, wherein the first cutting blade is axially displaceably supported on the respective shaft to change an axial spacing and an axial contact pressure between the first cutting blade and the second cutting blade of the cutting unit, and wherein an adjustment mechanism is provided, wherein the adjustment mechanism is coupled to the axially displaceable first cutting blade to displace the displaceable cutting blade in the axial direction, and adjusting an axial spacing between the first cutting blade and the second cutting blade of the cutting unit to change the axial contact pressure between the first cutting blade and the second cutting blade by means of the adjustment mechanism.

The method is thus based on the basic idea of setting the axially displaceable cutting blades such that the user does not have to touch either the cutting blade itself or a cutting blade mount that is usually present. Instead, the user actuates the adjustment mechanism, which is coupled to the at least one first cutting blade or its cutting blade mount, to set the spacing or the contact force between the cutting blades.

In accordance with an embodiment, the adjustment mechanism projects from the outer region of the apparatus into the inner space and the adjustment of the axial spacing between the first cutting blade and the second cutting blade of the cutting unit is effected by means of a manual actuation of an actuation element or adjustment element of the adjustment mechanism arranged in the outer region, for example a lever of the adjustment mechanism.

Alternatively thereto, the adjustment of the axial spacing between the first cutting blade and the second cutting blade of the cutting unit can be effected by means of a mechanical drive.

For the adjustment of the axial spacing between the first cutting blade and the second cutting blade, an adjustment element can be adjusted in the axial direction by a rotation of a drive shaft of the adjustment mechanism. In other words, the first cutting blade can be adjusted by means of a spindle drive.

To guide the movement of the adjustment element, for the adjustment of the axial spacing between the first cutting blade and the second cutting blade, the adjustment element can be adjusted along a guide rod that is in particular separate from the first shaft.

In accordance with an embodiment, at least two axially displaceable first cutting blades are arranged on the first shaft and are displaced at the same time, in particular at the same speed, in the axial direction by means of the adjustment mechanism during the setting of the apparatus.

The two axially displaceable first cutting blades can form a cutting unit arranged in the inner space together with the second cutting blade during operation and the first cutting blades can be displaced at the same time, in particular at the same speed, in opposite axial directions by means of the adjustment mechanism during the setting of the apparatus.

In accordance with an embodiment, a contact force between the at least one axially displaceable first cutting blade and the at least one second cutting blade can be measured directly or indirectly. A contact force between the at least one axially displaceable first cutting blade and the at least one second cutting blade or counter-blade can, for example, be measured in that a motor power of the blade drive or of the actuating drive is measured. Alternatively or additionally, an adjustment path of the first cutting blade relative to its counter-blade can be detected and a contact force can be calculated from the detected adjustment path.

In accordance with a further embodiment, the contact force or the contact pressure between the axially displaceable first cutting blade and the respective counter-blade can be regulated. For this purpose, desired values dependent on the respective packaging to be cut, i.e. dependent on the film type and/or film thickness, can be determined and stored in a database. A user can then, for example, in a menu item select the type of packaging to be processed. Depending on the packaging to be cut, the apparatus can retrieve a desired value for the contact pressure from the database and can regulate the actuating drive such that the contact pressure between the axially displaceable first cutting blade and the respective counter-blade substantially corresponds to the desired value retrieved from the database.

Figure 2:
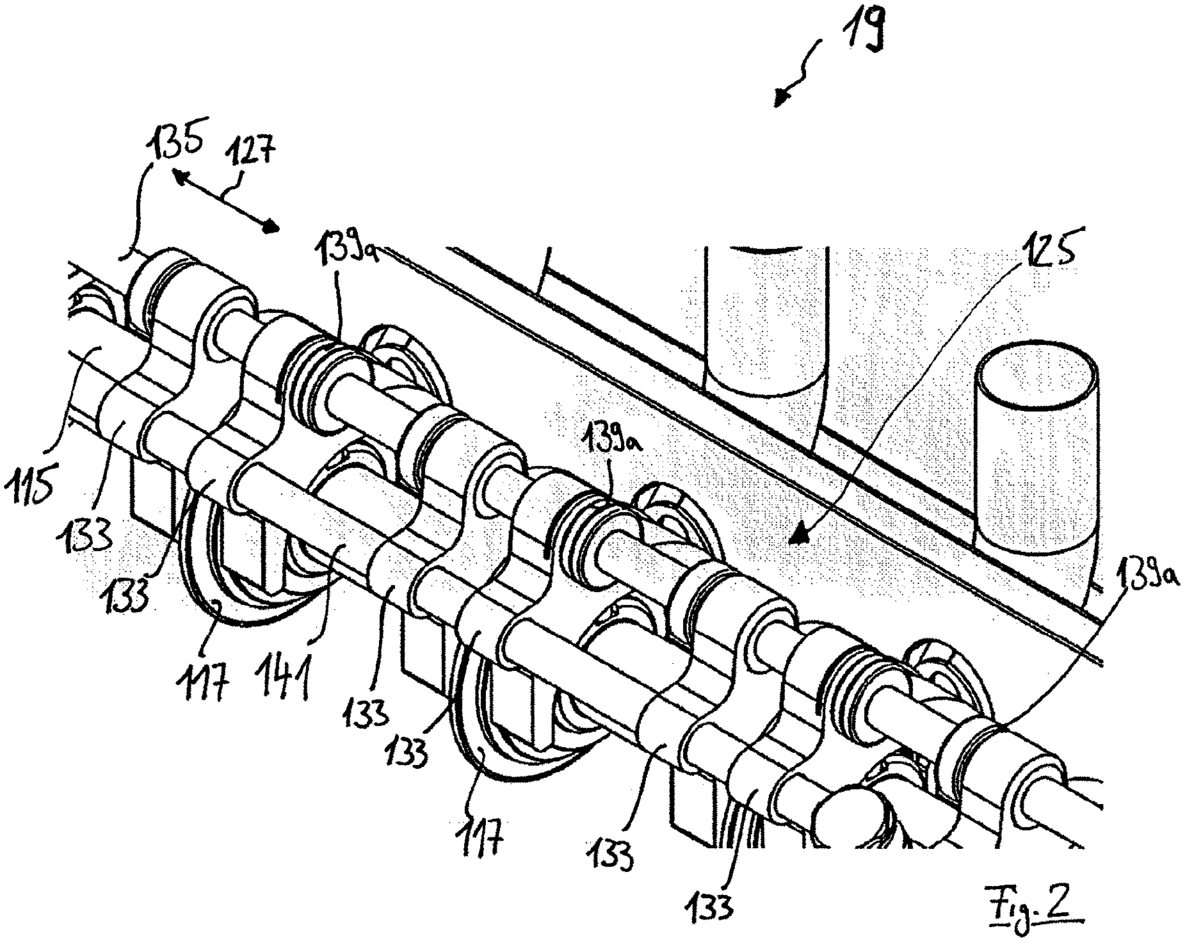
Figure 3:
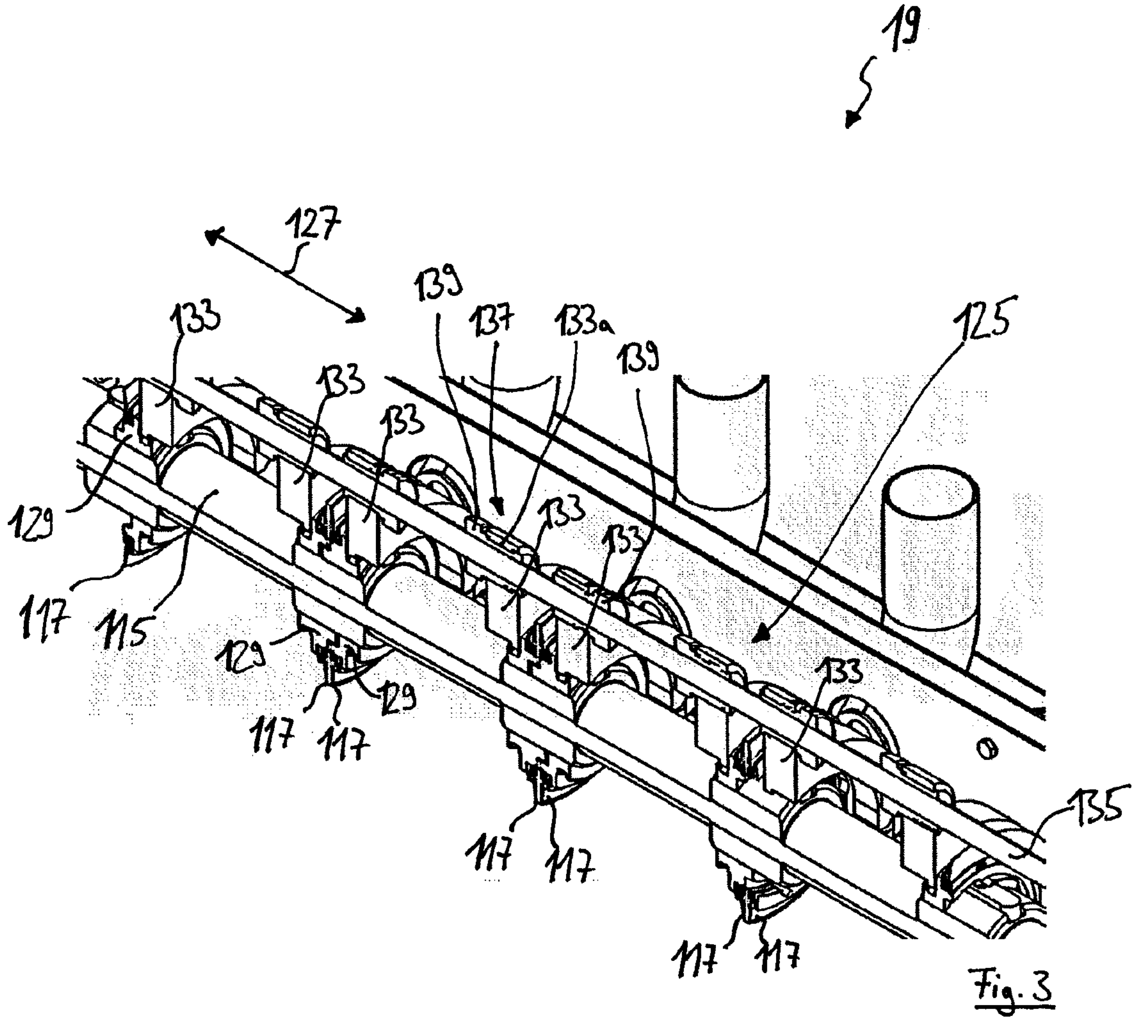
Figure 4:
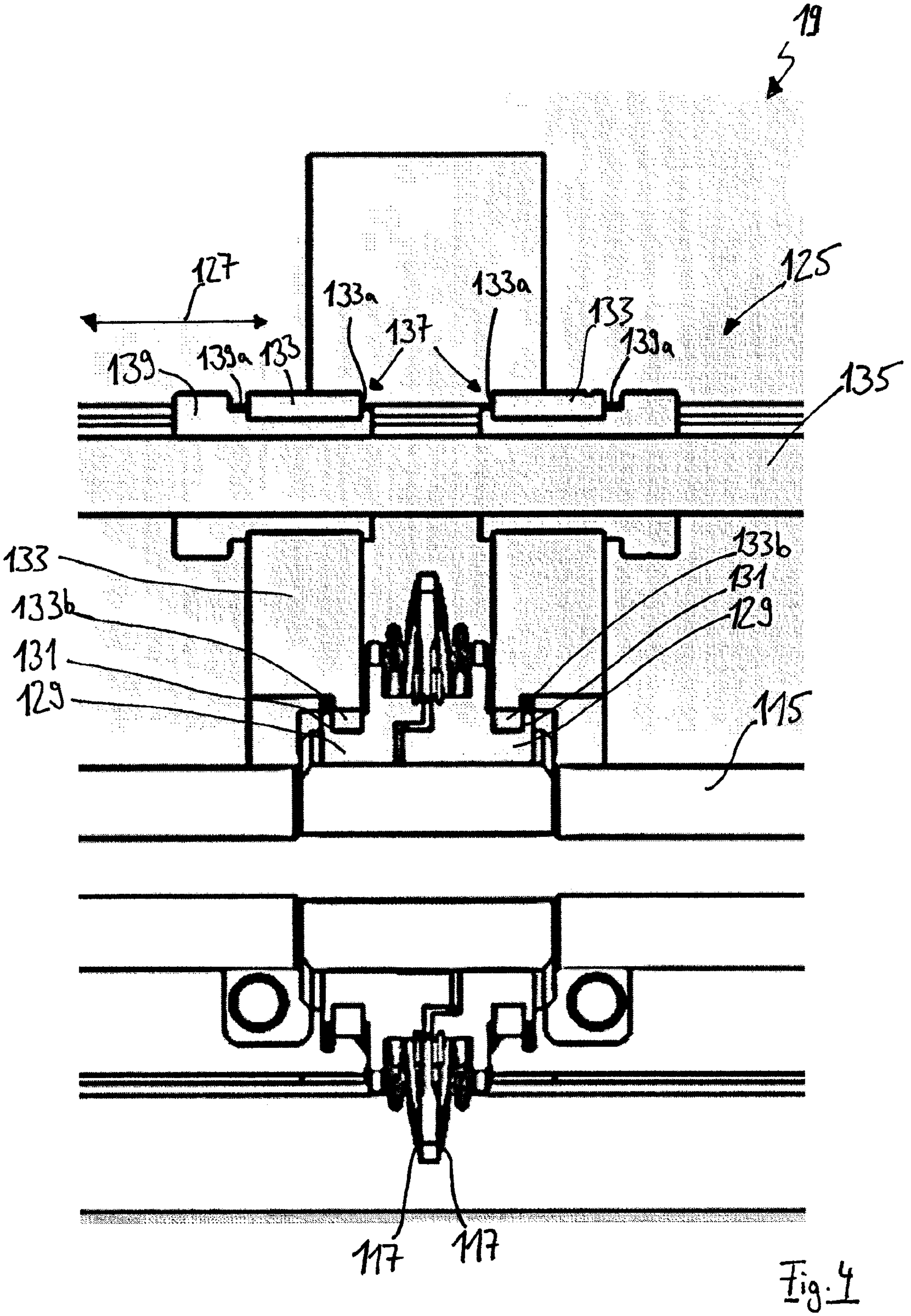
Figure 5A:
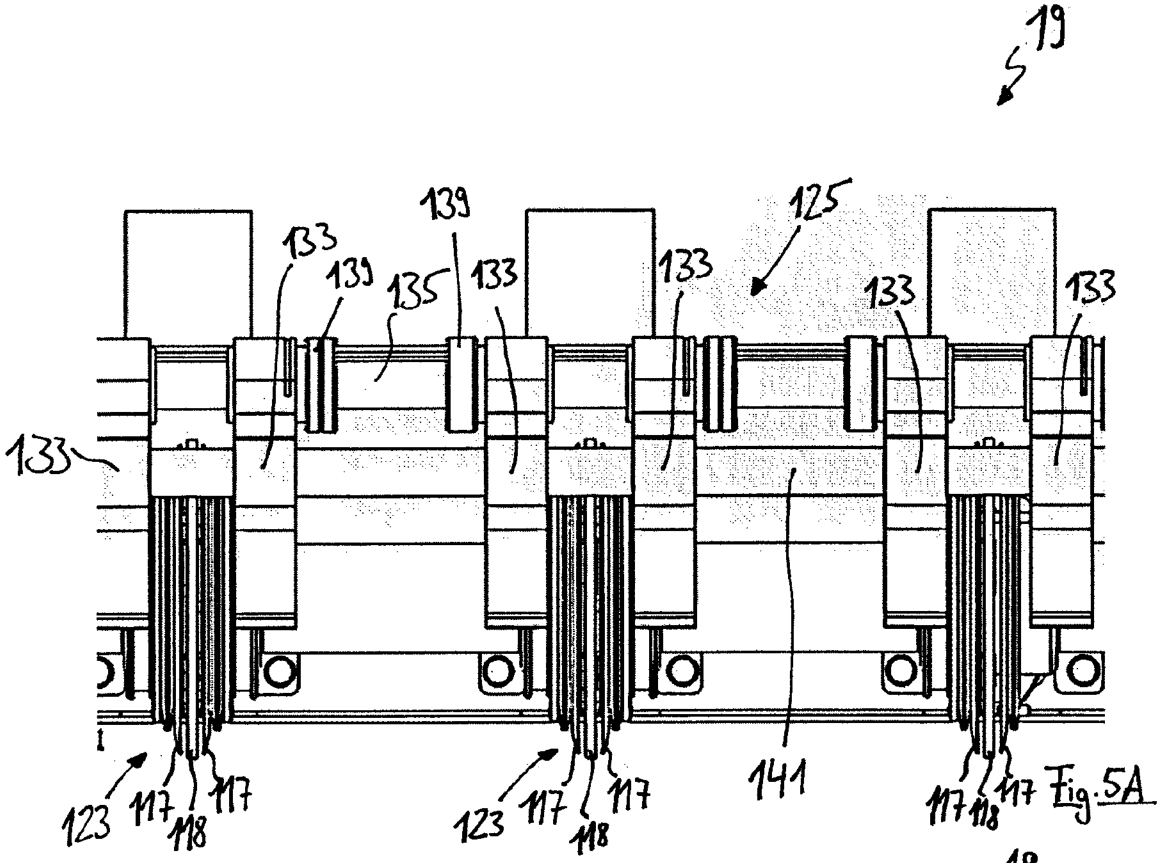
Figure 5B:
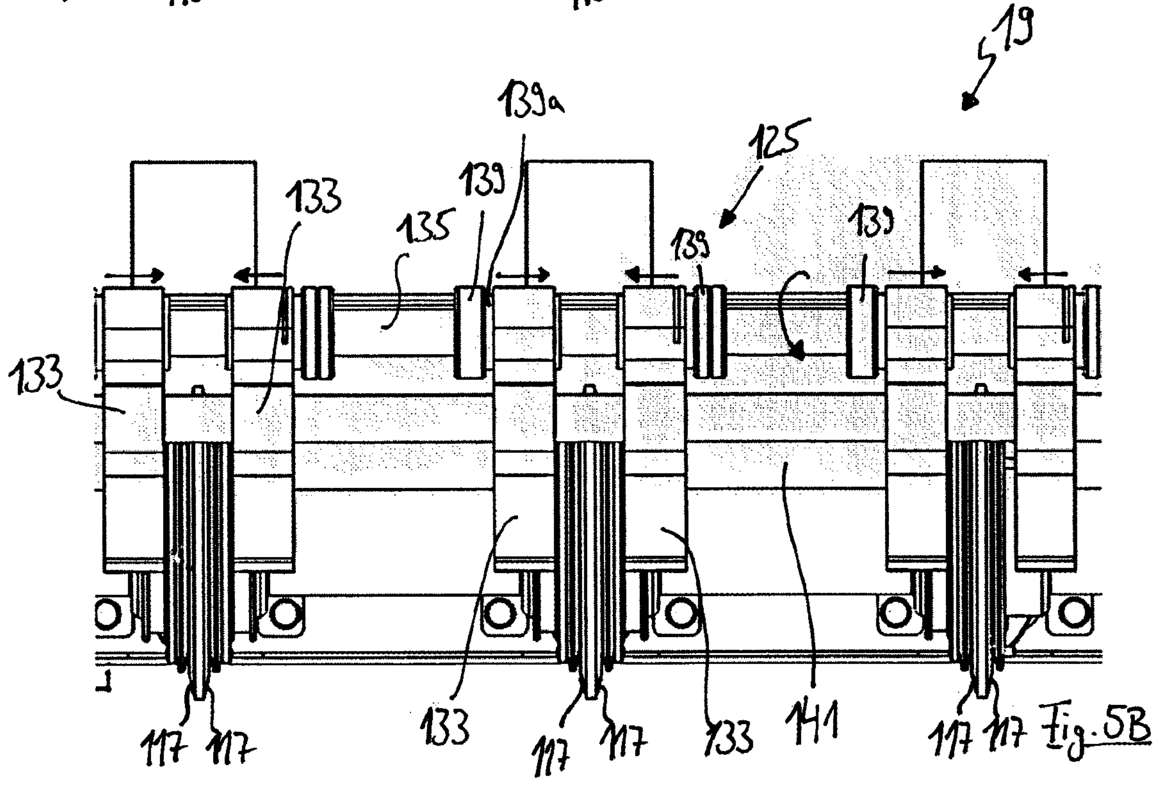
Figure 6A:
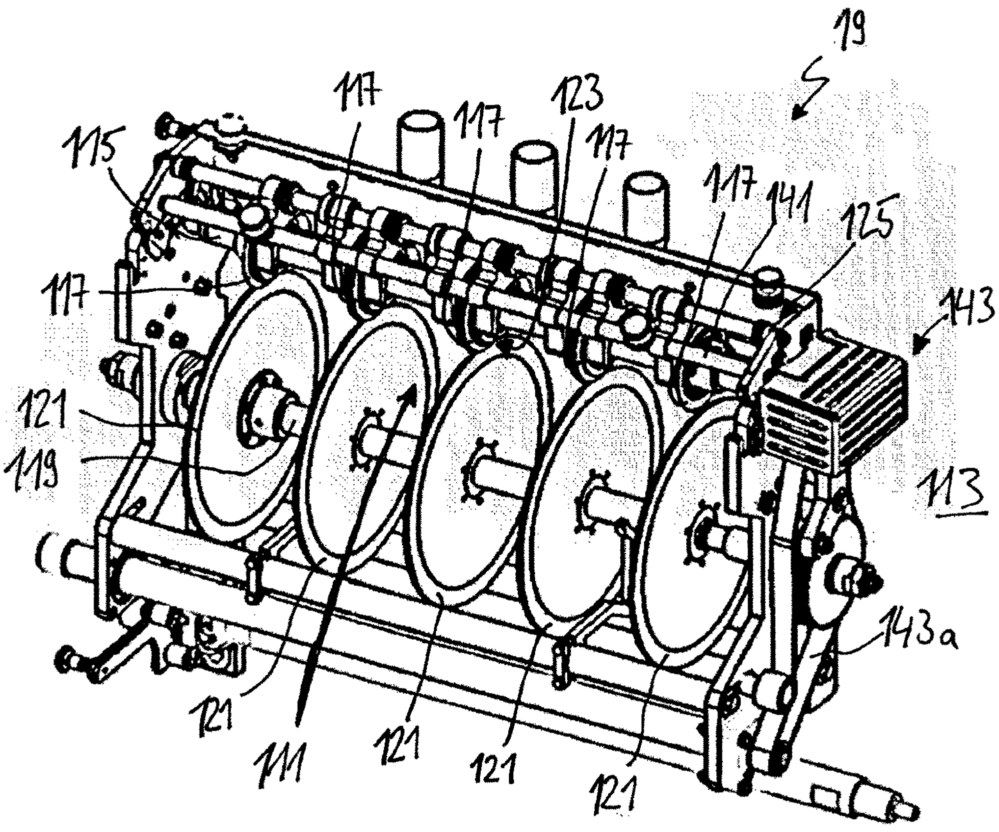
Figure 6B:
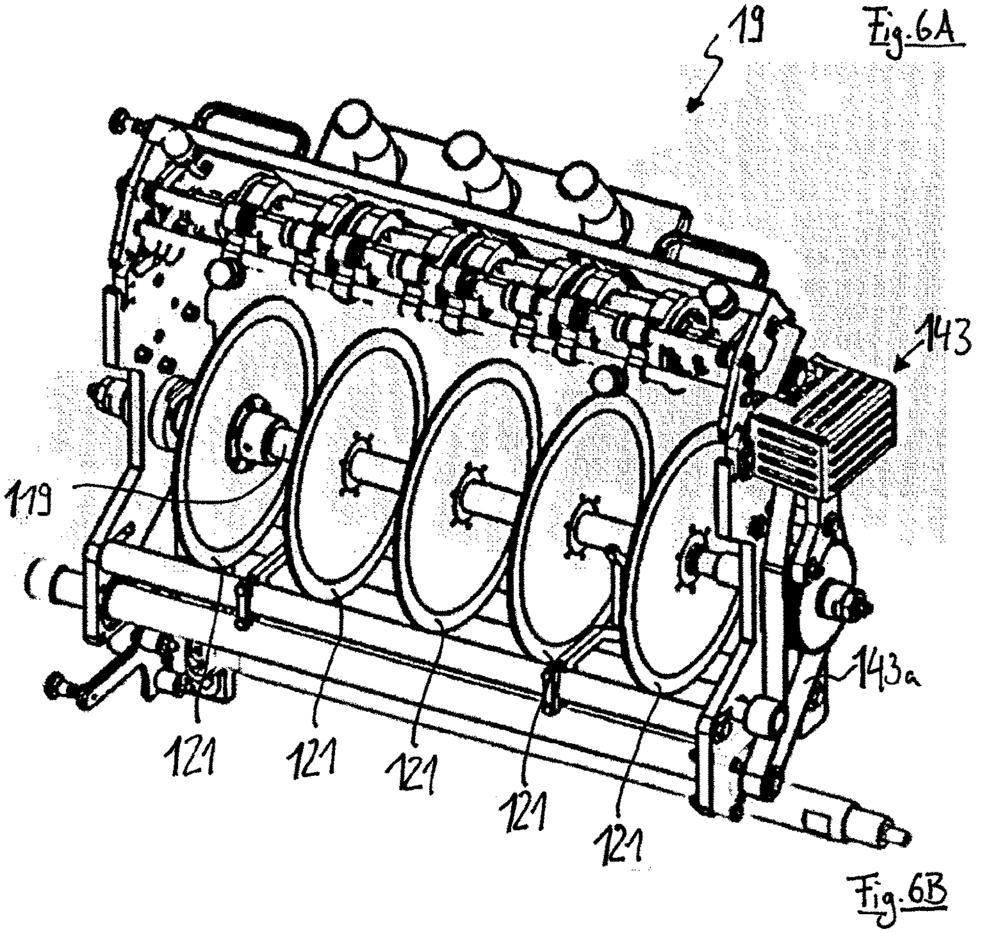
Figure 7A:
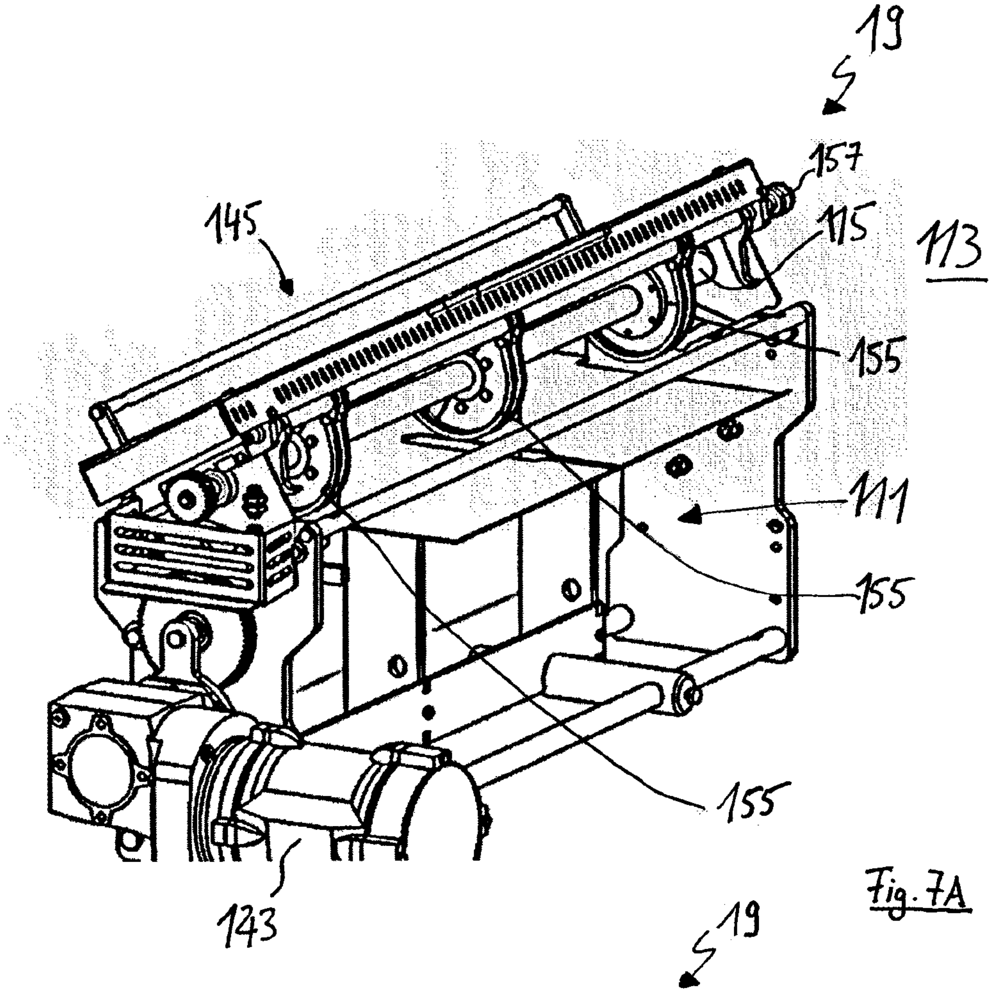
Figure 7B:
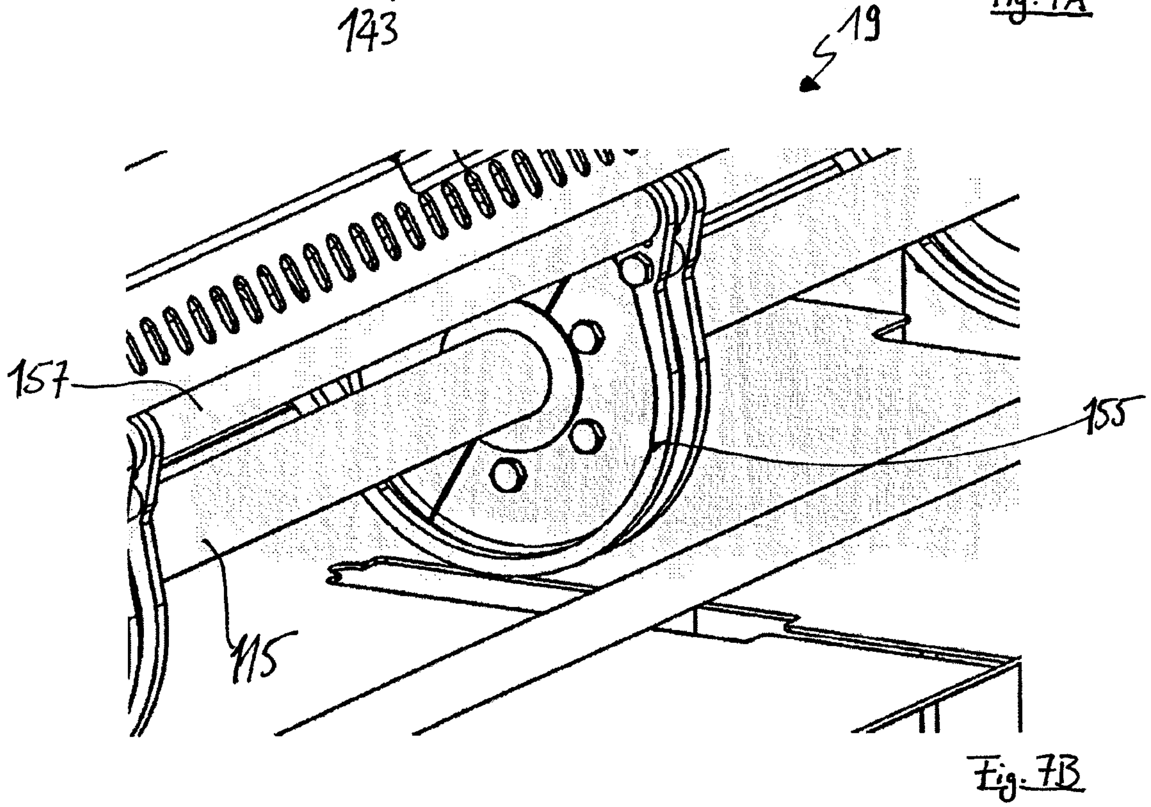
Figure 8A:
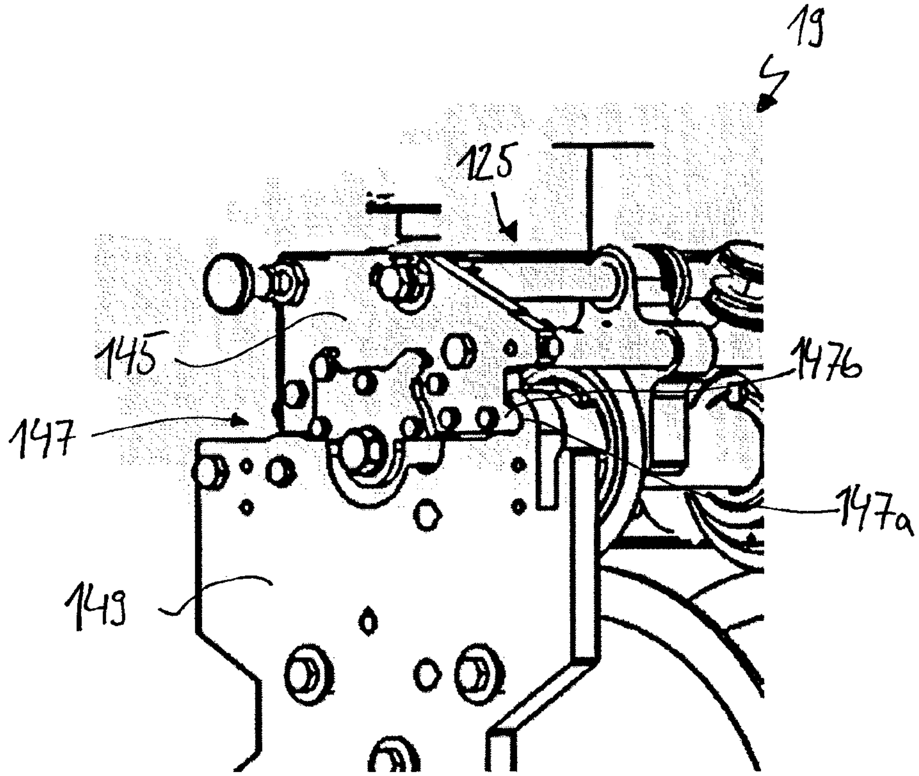
Figure 8B:
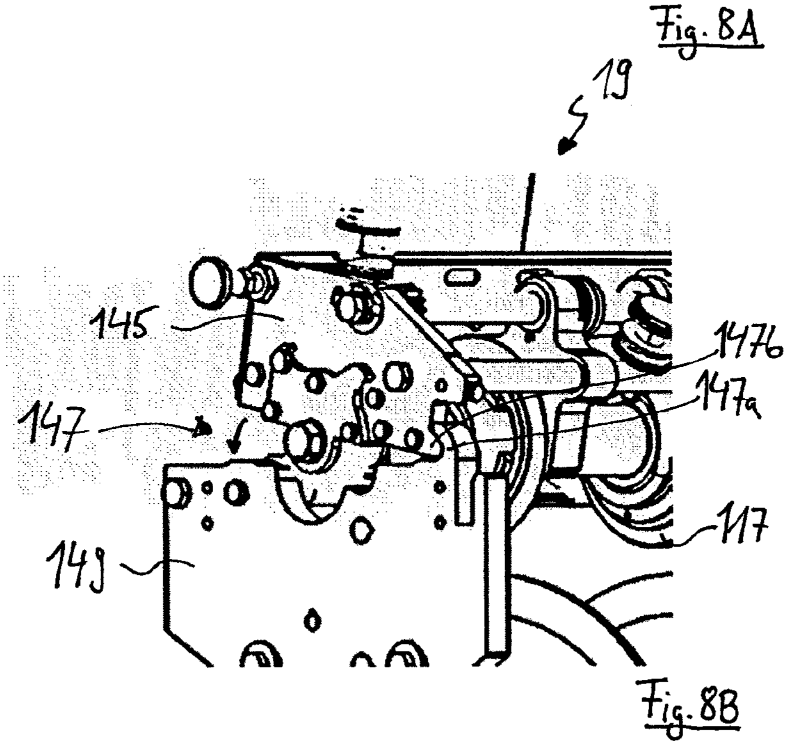
Figure 9A:
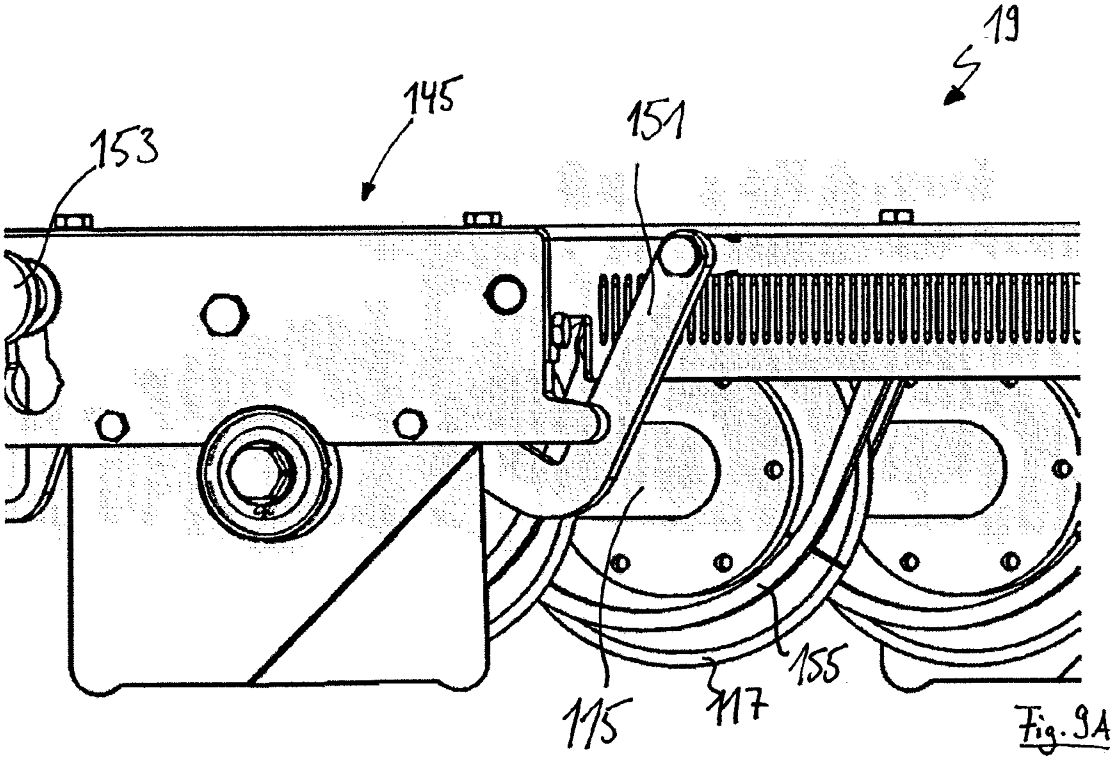

The invention will be described with reference to purely exemplary embodiments and to the enclosed drawings in the following. There are shown:

FIG. 1 a packaging machine with its different stations;

FIG. 2 a perspective view of an adjustment mechanism for first cutting blades;

FIG. 3 a perspective sectional representation of the adjustment mechanism of FIG. 2;

FIG. 4 a frontal sectional view of the adjustment mechanism of FIG. 2;

FIG. 5A the adjustment mechanism of FIG. 2 in a starting position;

FIG. 5B the adjustment mechanism of FIG. 2 in an end position;

FIG. 6A an apparatus for cutting food packagings to size along a longitudinal direction in an active position;

FIG. 6B a front view of the apparatus of FIG. 6A with a raised hood;

FIG. 7A a rear view of an apparatus with a raised hood in accordance with a further embodiment;

FIG. 7B a detailed view of FIG. 7A;

FIG. 8A a detailed view of an interface between a base and the hood in operation;

FIG. 8B a detailed view of the interface of FIG. 8A with a raised hood;

FIG. 9A a detailed view of a blade cover in the deactivated state; and

Figure 9B:
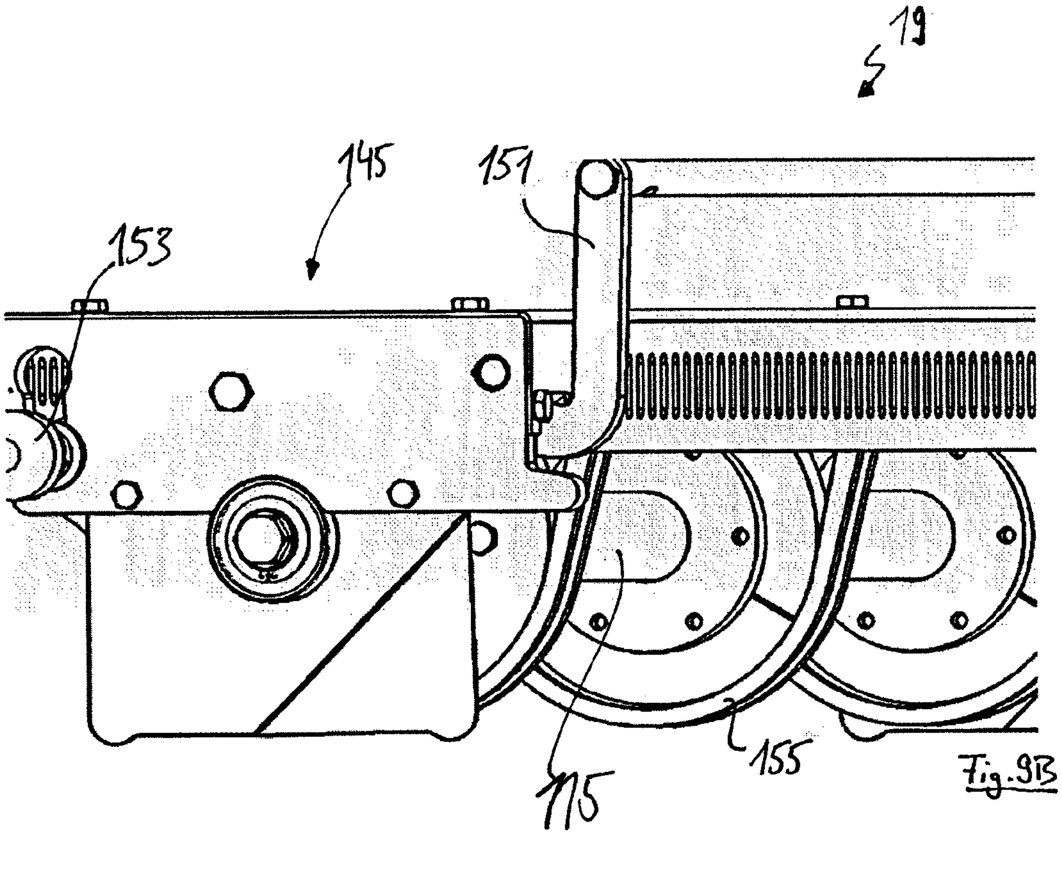

FIG. 9B a detailed view of the blade cover of FIG. 9A in the activated state.

The packaging machine 12 that is shown in FIG. 1 and that operates in a direction of transport T comprises a machine frame 47. A transport chain 27, which is only schematically shown here at the end of the machine disposed upstream, is guided at a left side frame and at a right side frame of the machine frame 47 in each case. The two transport chains 27 together form a conveying means for a bottom film 23 drawn off from a supply roll 23*a*.

The packaging machine 12 comprises a plurality of work stations following one another in the direction of transport T, namely a molding station 11 also designated as a deep-drawing machine or a thermoforming machine, an insertion station 13 for products 10 to be packaged, a feed station 14 for a top film 25 drawn off from a supply roll 25*a*, a sealing station 15 for connecting the bottom film 23 to the top film 25, a labeling station 16, a transverse separation station 17, and a longitudinal separation station 19, i.e. an apparatus 19 for cutting packagings 21 to size along a longitudinal direction.

The products 10 to be packaged are, for example, food products, here in the form of so-called portions, that each comprise a plurality of slices that were previously cut off from a loaf-shaped or bar-shaped food, such as sausage, cheese, ham or meat, by means of a food slicer (not shown).

A central control device 41 controls the operation of the packaging machine 12, including the work stations mentioned. Furthermore, the packaging machine 12 is provided with an operating device 45 that e.g. comprises a touch screen at which all the necessary information can be displayed to an operator and the operator can make all the necessary settings before and during the operation of the machine.

At the molding station 11, which comprises a top tool 11*a* and a bottom tool 11*b*, recesses 29, which are also designated as depressions, are formed in the bottom film 23 in a deep-drawing process in each case. The products or portions 10 mentioned are inserted into these recesses 29 at the insertion station 13. The insertion station 13 here comprises a so-called feeder of which two endless conveyor belts 13*a*, 13*b* are shown. Alternatively or additionally, the insertion station 13 can comprise a robot 50 that is likewise schematically shown here, e.g. in the form of a so-called "picker" that can be configured as a delta robot having a gripper 52 that comprises two buckets that jointly hold a respective portion 10. Such robots and their use in the handling of foods, in particular on the insertion of portions into recesses of packagings, are generally known to the skilled person so that further statements are not necessary here.

The bottom film 23 provided with the filled recesses 29 and the top film 25 are subsequently fed to the sealing station 15 that comprises a top tool 15*a* and a bottom tool 15*b*. The top film 25 and the bottom film 23 are connected to one another by means of these tools 15*a*, 15*b*. The recesses 29 and thus the packagings 21 formed by the top film 25 and the bottom film 23 are hereby closed. Sealing points 43 that extend transversely to the direction of transport T and that are also designated as sealing seams are schematically indicated in FIG. 1.

Subsequent to the sealing station 15, the packagings 21 are still connected by the top film 25 and the bottom film 23 and therefore still have to be separated. The transverse separation station 17 and the longitudinal separation station 19 serve for this purpose.

FIGS. 2 and 3 show an upper cutting blade shaft 115 of the longitudinal separation station 19, i.e. of the apparatus 19 for cutting food packagings to size along the longitudinal direction. A plurality of cutting blades 117 are arranged on the cutting blade shaft 115. These cutting blades 117 are adjustable in the axial direction 127 (see FIG. 3) by means of an adjustment mechanism 125. For this purpose, for each first cutting blade 117, the adjustment mechanism 125 comprises an adjustment element 133 associated with said first cutting blade 117. The adjustment elements 133 are each coupled to corresponding cutting blade holders 129 (see FIG. 4) that hold the respective cutting blade 117 and that are displaceably supported on the cutting blade shaft 115. The cutting blade holders 129 have first coupling means 131 in the form of a groove into which second coupling means 133*b* in the form of a rib engage, said second coupling means 133*b* being formed by the respective adjustment element 133. A form-fitting connection between the first coupling means 131 and the second coupling means 133*b* is hereby produced.

The adjustment elements 133 also have an opening that has an internal thread 133*a* and that is in engagement with an external thread 139*a* associated with a drive shaft 135. In the embodiment shown, a sleeve 139, which is rotationally fixedly and axially fixedly fastened to the drive shaft 135, is provided on the drive shaft 135 for each adjustment element 133. The external thread 139*a* is formed at an outer peripheral side of the sleeve 139. The external thread 139*a* and the internal thread 133*a* together form a gear 137 that converts a rotational movement of the drive shaft 135 into a translatory movement of the respective adjustment element 133. Thus, a translatory movement of the respective first cutting blade 117 in the axial direction can be produced by a rotational movement of the drive shaft 135.

A guide rod 141 (see FIG. 2), along which the adjustment elements 133 are displaceably supported, serves to guide the translatory movement.

FIGS. 5A and 5B show in detail how the rotational movement of the drive shaft 135 is converted into translatory movements of the cutting blades 117. As can be seen in the Figures, a respective two first cutting blades 117 are arranged adjacent to one another. These cutting blades 117 arranged adjacent to one another form a cutting unit 12 together with a second cutting blade 121 (see FIG. 6*b*) that is in contact with the two first cutting blades 117 during operation. The cutting units 123 serve to separate two food packagings from one another and to cut away a center strip between the food packagings in so doing. To ensure a controlled transporting away of the center strips, disks 118 are provided between the first cutting blades 117 of the cutting units 123. The center strips are clamped and transported away in a guided manner between a peripheral surface of the disk 118 and a peripheral surface of the corresponding second cutting blade 121.

On the setting of a spacing and a contact force between the first cutting blades 117 and the respective second cutting blade 123, the cutting blades 117 arranged adjacent to one another are moved toward one another and thus against the second cutting blade 123 arranged between the first cutting blades 123. So that adjacent adjustment elements 133 move toward one another on the rotation of the drive shaft 135, the internal threads 133*a* of the adjacent adjustment elements are equipped with opposite threads. In other words, one of the internal threads 133*a* has a right-hand thread and the internal thread 133*a* of the adjacent adjustment element 133 has a left-hand thread. So that both adjustment elements 133 move toward one another at a speed of the same magnitude, the internal threads 133*a* of the respective adjacent adjustment elements 133 have thread pitches equal in magnitude. The external threads 139*a* at the outer peripheral sides of adjacent sleeves 139 accordingly likewise have opposite threads.

In FIGS. 6A and 6B, it can be seen that the second cutting blades 121 are arranged on a second shaft 119. The first shaft 115 with the first cutting blades 117 and the second shaft 119 with the second cutting blades 121 extend in an inner space 111 of the longitudinal separation station 19, and indeed in each case perpendicular to the conveying direction T. The first shaft 115 and the second shaft 119 can each be driven via a blade drive 143. For this purpose, the blade drive 143 has a belt 143*a* that transmits a drive torque from a driven shaft, not shown, of the blade drive 143 to the first shaft 115 and the second shaft 119. In this respect, the drive torque is transmitted to the first shaft 115 and the second shaft 119 such that the two shafts 115, 119 rotate in opposite directions of rotation during operation.

As an alternative to the blade drive 143 comprising the belt 143*a*, a variant is shown in FIG. 7A in which the drive torque is transmitted from a driven shaft, not shown, of the blade drive 143' via a toothed wheel pair 143*a*' and 143*b*' to the first shaft 115. A removal and an installation of the first shaft 115 are hereby facilitated.

As can in particular be seen in FIGS. 6B and 7A, the first shaft 115 is part of a removable unit that will be designated as a hood 145 in the following. An interface 147 for fastening the hood 145 to a base 149 is generally shown in FIGS. 8A and 8B. The interface 147 is configured to place the hood 145 onto the base 149 by means of a pivot movement. For this purpose, the interface 147 comprises a hook-shaped section 147*a* at the base 149 and a section 147*b* that can be hung into the hook-shaped section 147*a*. In the present example, the hood 145 with the upper blade shaft 115 is fixed in place only by the hooking in and its own weight.

In FIGS. 9A and 9B, it can be seen how a blade cover 155 is adjustable between an inactive position (FIG. 9A) and an active position (FIG. 9B). The lever 151 and the actuation element 153 serve for this purpose. Due to an adjustment of the lever 151 and/or the actuation element 153, the blade cover 155 can be adjusted from a position not projecting over the blade edge (see FIG. 9A) into a position projecting over the blade edge in the radial direction (see FIG. 9B). In other words, in the active state, the elements forming the blade cover 155 are arranged laterally next to the blade edge of the respective first blade 117 such that a user cannot grab onto the blade edge of the blades 117 due to a lack of attention.

Further elements of the adjustment mechanism 155 of the blade covers 155 can be seen in FIGS. 7A and 7B. The blade covers 155 are rotationally fixedly connected to an adjustment shaft 157. The blade covers 155 of the first cutting blades 117 are hereby jointly pivotable by a rotation of the adjustment shaft 157 between the active position (see FIGS. 7B and 9B) and the release position (see FIG. 9A). The adjustment shaft 157 is coupled to the lever 151 and the actuation element 153 to be able to manually rotate the adjustment shaft 157. In general, it would also be conceivable to provide only one lever 151 or one actuation element 153. However, a combination of the lever 151 and the actuation element 153 allows an adjustment of the blade cover 155 with particularly little force. Furthermore, the hood 145 can be raised by means of a lever force by a pivot movement of the blade cover, for example, against an intermediate metal sheet 159.

REFERENCE NUMERAL LIST

10 product
11 molding station
11*a* top tool
11*b* bottom tool
12 packaging machine
13 insertion station
13*a* endless conveyor belt
13*b* endless conveyor belt
14 feed station
15 sealing station
15*a* top tool
15*b* bottom tool
16 labeling station
17 transverse separation station
19 longitudinal separation station
21 packaging
23 bottom film
23*a* supply roll
25 top film
25*a* supply roll
27 transport chain
29 recess
41 control device
43 sealing point
45 operating device
47 machine frame
50 robot
52 gripper
111 inner space 113 outer region
115 first shaft
117 first cutting blade
118 disk
119 second shaft
121 second cutting blade
123 cutting unit
125 adjustment mechanism
127 axial direction
129 cutting blade holder
131 first coupling means/groove
133 adjustment element
133*a* internal thread
133*b* second coupling means/rib
135 drive shaft
137 gear
139 sleeve
139*a* external thread
141 guide rod
143 blade drive
145 hood
147 interface
149 base
151 lever
153 actuation element
155 blade cover
157 adjustment shaft
159 intermediate metal sheet
T longitudinal direction/conveying direction

The invention claimed is:

1. A packaging machine comprising an apparatus for cutting food packagings to size along a longitudinal direction, wherein the apparatus defines an inner space and an outer region, said apparatus having a first shaft extending in the inner space, the first shaft having at least a first cutting blade rotationally fixedly arranged on the first shaft such that the first cutting blade and the first shaft are non-rotatable relative to each other, the first shaft being a rotational drive shaft for the first cutting blade, and a second shaft which extends in the inner space and on which at least a second cutting blade is arranged, said second cutting blade forming a cutting unit arranged in the inner space together with the first cutting blade during operation, wherein the first cutting blade is axially displaceably supported on the respective shaft to change an axial spacing and an axial contact pressure between the first cutting blade and the second cutting blade of the cutting unit, and said apparatus having an adjustment mechanism, wherein the adjustment mechanism is coupled to the axially displaceable first cutting blade to displace the displaceable first cutting blade in an axial direction.

2. A packaging machine in accordance with claim 1, wherein the cutting unit is a roller shear cutting unit.

3. A packaging machine in accordance with claim 1, wherein the adjustment mechanism projects from the outer region into the inner space of the apparatus.

4. A packaging machine in accordance with claim 1, wherein the adjustment mechanism is coupled to a mechanical drive.

5. A packaging machine in accordance with claim 1, wherein at least two axially displaceable first cutting blades are arranged on the first shaft, and wherein the adjustment mechanism is coupled to the axially displaceable first cutting blades such that the first cutting blades can be displaced at the same time in the axial direction.

6. A packaging machine in accordance with claim 5, wherein the adjustment mechanism is coupled to the axially displaceable first cutting blades such that the first cutting blades can be displaced at the same speed in the axial direction.

7. A packaging machine in accordance with claim 5, wherein the two axially displaceable first cutting blades form a cutting unit arranged in the inner space together with the second cutting blade during operation, and wherein the adjustment mechanism is coupled to the axially displaceable first cutting blades such that the first cutting blades can be displaced at the same time in opposite axial directions.

8. A packaging machine in accordance with claim 7, wherein the adjustment mechanism is coupled to the axially displaceable first cutting blades such that the first cutting blades can be displaced at the same speed in opposite axial directions.

9. A packaging machine in accordance with claim 1, wherein the at least one axially displaceable first cutting blade is coupled to a cutting blade holder that is axially displaceably, but rotationally fixedly coupled to the first shaft, and wherein first coupling means, are provided at the cutting blade holder and cooperate with second coupling means, of the adjustment mechanism to axially displace the axially movable cutting blade holder together with the at least one first cutting blade.

10. A packaging machine in accordance with claim 9, wherein the first coupling means and the second coupling means are mechanical coupling means.

11. A packaging machine in accordance with claim 9, wherein the first coupling means are formed as a peripheral groove at the cutting blade holder and the second coupling means of the adjustment mechanism are formed as an axially adjustable adjustment element engaging into the groove, or wherein the first coupling means are formed as a peripheral rib at the cutting blade holder and the second coupling means of the adjustment mechanism are formed as an axially adjustable adjustment element engaging around the rib at both sides.

12. A packaging machine in accordance with claim 1, wherein the adjustment mechanism comprises a drive shaft extending in the direction of the first shaft and the second shaft, and wherein the adjustment mechanism comprises a gear to convert a rotational drive movement of the drive shaft into a translatory movement of the at least one first cutting blade along the first shaft.

13. A packaging machine in accordance with claim 12, wherein the drive shaft at least sectionally has a non-circular cross-section, wherein a sleeve comprising an inner peripheral surface adapted to the non-circular cross-section and an outer thread on an outer peripheral surface is arranged axially secured on the sectionally non-circular cross-section, and wherein the adjustment element has an opening that extends in the axial direction and that has an internal thread engaging into the external thread.

14. A packaging machine in accordance with claim 1, wherein the adjustment mechanism comprises at least one adjustment element that is supported guided in the axial direction of the first shaft.

15. A packaging machine in accordance with claim 14, wherein the adjustment element is supported guided in the axial direction of the first shaft along a separate guide rod.

16. A packaging machine in accordance with claim 1, wherein a sensor is provided for determining a position of the adjustment mechanism.

17. A packaging machine in accordance with claim 16, wherein a control device is provided that evaluates, on the basis of the position determined by the sensor, during operation whether the at least one first cutting blade and the at least one second cutting blade contact one another with a necessary contact pressure to cut the food packagings to size.

18. A packaging machine in accordance with claim 1, wherein a determination device for determining a contact pressure between the first cutting blade and its respective counter-blade is provided.

19. A packaging machine in accordance with claim 1, wherein a regulation device is provided to regulate a contact pressure between the first cutting blade and its respective counter-blade to a desired value.

20. A method of setting a contact force between a first cutting blade and a second cutting blade of a cutting unit of a packaging machine comprising the steps:

providing an apparatus for cutting food packagings to size along a longitudinal direction, wherein the apparatus defines an inner space and an outer region, and wherein the apparatus comprises: a first shaft extending in the inner space, the first shaft having at least a first cutting blade rotationally fixedly arranged on the first shaft such that the first cutting blade and the first shaft are non-rotatable relative to each other, the first shaft being a rotational drive shaft for the first cutting blade, and a second shaft which extends in the inner space and on which at least a second cutting blade is arranged, said second cutting blade forming a cutting unit arranged in the inner space together with the first cutting blade during operation, wherein the first cutting blade is axially displaceably supported on the respective shaft to change an axial spacing and an axial contact pressure between the first cutting blade and the second cutting blade of the cutting unit, wherein an adjustment mechanism is provided, wherein the adjustment mechanism is coupled to the axially displaceable first cutting blade to displace the displaceable cutting blade in the axial direction, and adjusting an axial spacing between the first cutting blade and the second cutting blade of the cutting unit to change the axial contact pressure between the first cutting blade and the second cutting blade by means of the adjustment mechanism.

21. A method in accordance with claim 20, wherein the adjustment mechanism projects from the outer region of the apparatus into the inner space, and wherein the adjustment of the axial spacing between the first cutting blade and the second cutting blade of the cutting unit is effected by means of a manual actuation of an actuation element of the adjustment mechanism arranged in the outer region.

22. A method in accordance with claim 20, wherein the adjustment of the axial spacing between the first cutting blade and the second cutting blade of the cutting unit is effected by means of a mechanical drive.

23. A method in accordance with claim 20, wherein, for the adjustment of the axial spacing between the first cutting blade and the second cutting blade, an adjustment element is adjusted in the axial direction by a rotation of a drive shaft.

24. A method in accordance with claim 20, wherein, for the adjustment of the axial spacing between the first cutting blade and the second cutting blade, an adjustment element is adjusted along a guide rod.

25. A method in accordance with claim 24, wherein the adjustment element is adjusted along a guide rod that is separate from the first shaft.

26. A method in accordance with claim 20, wherein at least two axially displaceable first cutting blades are arranged on the first shaft and the first cutting blades are displaced at the same time in the axial direction by means of the adjustment mechanism.

27. A method in accordance with claim 26, the first cutting blades are displaced at the same time at the same speed in the axial direction by means of the adjustment mechanism.

28. A method in accordance with claim 26, wherein the two axially displaceable first cutting blades form a cutting unit arranged in the inner space together with the second cutting blade during operation and the first cutting blades are displaced at the same time in opposite axial directions by means of the adjustment mechanism.

29. A method in accordance with claim 28, wherein the first cutting blades are displaced at the same time at the same speed in opposite axial directions by means of the adjustment mechanism.

30. A method in accordance with claim 20, wherein a contact force between the at least one axially displaceable first cutting blade and the at least one second cutting blade is determined directly or indirectly.

31. A method in accordance with claim 30, wherein the contact force between the at least one axially displaceable first cutting blade and the at least one second cutting blade is regulated to a definable desired value.

* * * * *